United States Patent [19]

Cawley et al.

[11] Patent Number: 4,667,221

[45] Date of Patent: May 19, 1987

[54] VIDEO EDITING SYSTEMS WITH ALLOWABLE RANGE FOR KEY SIGNAL SET BY DETECTING THE RANGE IN A SELECTED AREA

[75] Inventors: Robin A. Cawley; Roderick J. Pratt, both of Newbury, Great Britain

[73] Assignee: Quantel Limited, Surrey, United Kingdom

[21] Appl. No.: 752,358

[22] Filed: Jul. 5, 1985

[30] Foreign Application Priority Data

Aug. 16, 1984 [GB] United Kingdom ............... 8420890

[51] Int. Cl.⁴ .............................................. H04N 9/75
[52] U.S. Cl. ...................................... 358/22; 358/183
[58] Field of Search .................................. 358/22, 183

[56] References Cited

U.S. PATENT DOCUMENTS

| | | | |
|---|---|---|---|
| 3,832,485 | 8/1974 | Pieters | 358/183 |
| 4,240,104 | 12/1980 | Taylor et al. | 358/22 |
| 4,258,385 | 3/1981 | Greenberg et al. | 358/22 |
| 4,292,649 | 9/1981 | Macheboeuf | 358/22 |
| 4,394,680 | 7/1983 | Watanabe | 358/22 |
| 4,413,273 | 11/1983 | Wischermann | 358/22 |
| 4,484,230 | 11/1984 | Pugsley | 358/80 |
| 4,516,155 | 5/1985 | Hennig et al. | 358/80 |

*Primary Examiner*—John W. Shepperd
*Attorney, Agent, or Firm*—Cooper, Dunham, Griffin & Moran

[57] ABSTRACT

A system for combining two or more video signal inputs using a chrome key like system. The keying is not done to one color, such as saturated blue, but to any color within a range. One of the video signal inputs (1) is frozen and appears as a still picture on a display (6). Graphic means (16) are used to define an area of the picture and the maximum and minimum values of the color components of the signals in that area are detected. Whenever a signal with components falling within the detected range is present in a switch (14) it operates to select a channel for output. This works to build up a composite picture.

10 Claims, 4 Drawing Figures

FOREGROUND + CHROMA KEY

BACKGROUND

COMPOSITE PICTURE

VIDEO EDITING SYSTEMS WITH ALLOWABLE RANGE FOR KEY SIGNAL SET BY DETECTING THE RANGE IN A SELECTED AREA

This invention relates to video editing systems, and especially to such systems which utilise so called chroma keying for combining video signals representing different pictures to produce a composite picture. These systems are frequently used for adding background scenery to a picture of actors, or for introducing illustrations behind a newsreader or lecturer.

Such systems comprise at least two input channels for video signals representing two different pictures, an output channel and switch means for selectively switching the video signals from one or the other of the input channels to the output channel. It is usually arranged that the signals in one channel represent the subjects which are to appear in the foreground in the composite picture set against a uniform background say of saturated blue at a uniform luminance. The switch means is responsive to these signals in such a way that when the signals representing foreground subjects are present the switch connects the respective input channel to the output channel, but when signals representing the saturated blue are present, the switch connects the input channel carrying the background illustration with the output channel. The signals representing the saturated blue of uniform luminance are called chroma key signals.

One of the problems with this type of system is that the chroma key signal, though intended to be of uniform chrominance and luminance, is liable to exhibit unwanted variation and so the keying of the scene may become erratic. The variations in the chroma key signal can be caused by a combination of factors such as uneven lighting within the studio and also because of noise. Current systems try to overcome this problem by viewing the video sequence and manually varying the threshold levels at which the switching circuit operates until the best result is obtained. This method is obviously time consuming and does not always give satisfactory results.

The aim of the present invention is to produce a chroma keying or other similar editing system in which the switching is less susceptible to error due to unwanted variation in the keying signals.

According to the present invention there is provided a video signal editing system especially for television, comprising at least two input channels for video signals representing different pictures, an output channel, switch means for selectively outputting the video signal from one or another of the input channels to said output channel in dependence on the presence or absence of signals in one of said channels denoting a predetermined characteristic (say color), the improvement comprising means for defining an area of the picture represented by the signals in said one channel, and means for detecting the range of signals in said area denoting said characteristic, said switch means being arranged to perform the relative switching in dependence upon the presence or absence of signals in said range of values or in a range related thereto.

The area defining means may include frame freeze means for displaying a still picture of a frame of the video signals in said one channel, video graphic means for marking on said picture the boundary of said area and for generating address signals for applying video signals representing the picture points in said area to said detecting means.

As the predetermined characteristic may be color, the signals detected by the detecting means will have three dimensions, representing say a range of luminance values and a range of two color difference values. The three dimensions may alternatively be values of R, G, B or other color components. The operation of the switch means will then perform the selective switching in response to the presence of the signals representing all three color components within the detected range.

One example of the invention will be discussed with reference to the following drawings.

Figure 1A:
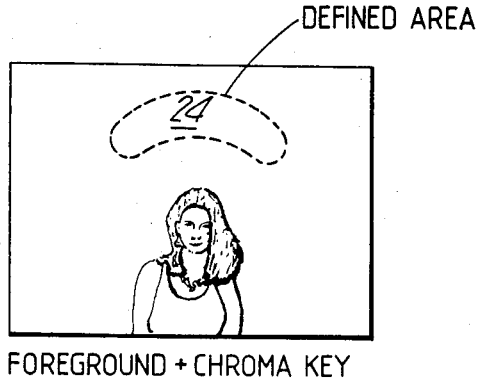
FIGS. 1a -1c show one example of the input and output video signals for which this invention can be used.
Figure 1B:
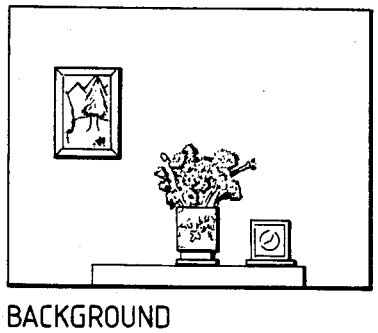
Figure 1C:

The scenes shown in FIG. 1a and 1b represent an example of the type of situation for which the invention is useful. FIG. 1a shows a subject, which is to appear in the foreground of the composite picture, behind which is the chroma key forming a background of uniform color, say saturated blue. FIG. 1b. shows the background illustration which in the composite picture FIG. 1c can be seen as replacing the areas of chroma key. In accordance with the invention a frame of video signals from one input channel, in this case the ones representing the scene in FIG. 1a, is frozen and displayed. This enables the operator to view the picture and decide which area within the chroma key is to be used to define the range of the predetermined characteristic to be used in the switching means. Once this area has been analysed and the range defined the switching means operates to combine the two input channels wherever signals representing components falling within the detected range are present.

Figure 2:
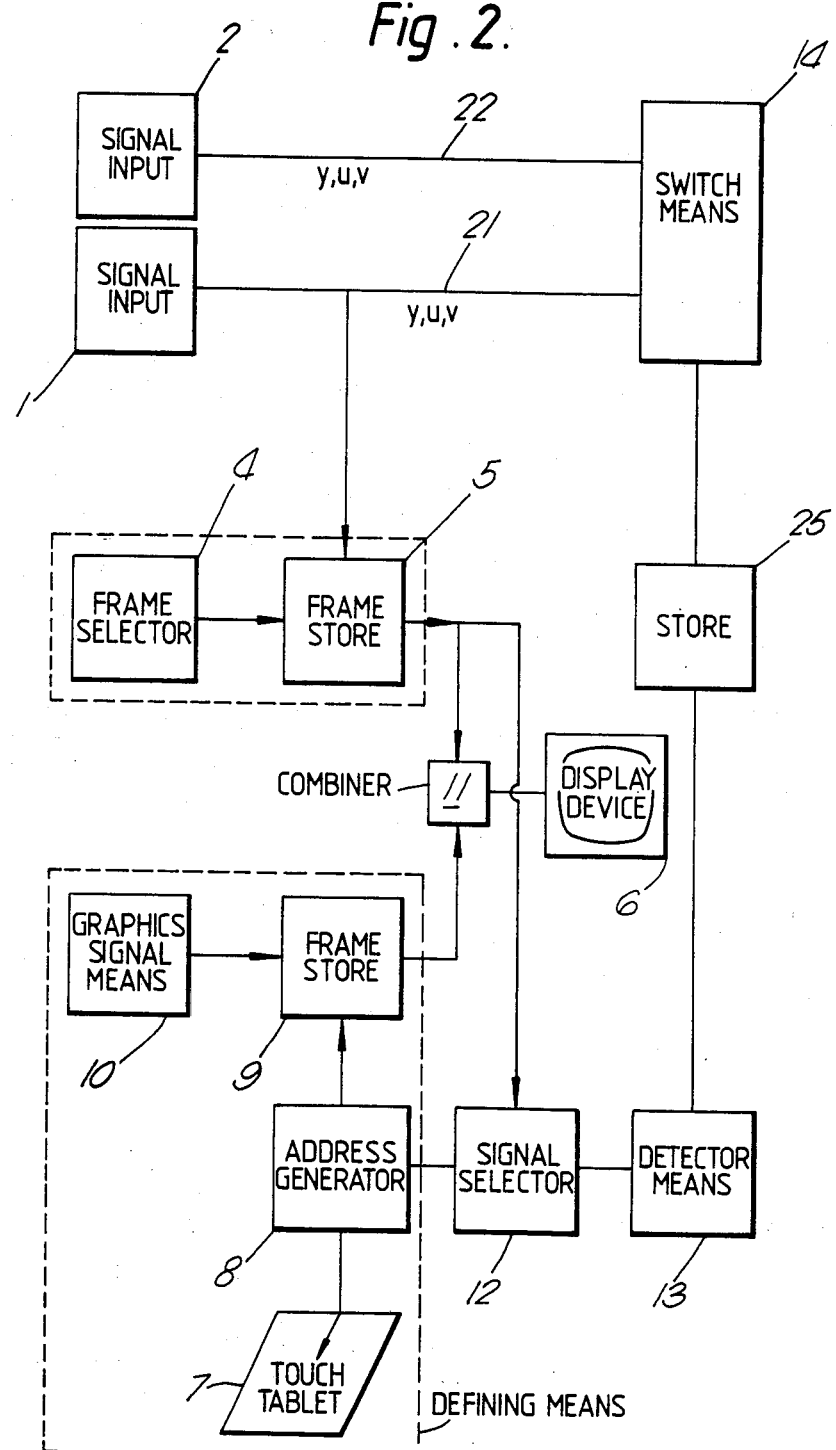
FIG. 2 shows a block diagram of the example.

One embodiment of the invention can be seen in FIG. 2. References 1 and 2 represent two sources of color video signals in television format and it will be assumed that the source 1 provides signals representing the subjects to be seen in the foreground of the composite picture, while source 2 provides signals representing the background for said subjects. Thus source 1 may be assumed to provide signals representing a picture such as shown in FIG. 1a while source 2 provides signals representing a picture such as shown in FIG. 1b. The signals from each source are arranged to be in digital form, each pixel comprising say eight binary bits, and each signal comprising three components at base band. The components are denoted as Y,U,V namely luminance and two color difference signals; the color difference signals are for example R-Y and B-Y or some other combination of the primary color signals. The signals from the two sources 1 and 2 are fed via two channels 21 and 22 to a switch 14, each channel in this case comprising three parallel paths each eight bits wide for carrying respectively the three components Y,U,V. All the video signal channels represented in the drawings by a single line are of this form.

Channel 21 branches to a frame store 5 which is part of the freeze frame means, another part being the frame selector 4.

In order to produce a still picture the frame selector 4 is operated and this causes a frame of video signals from channel 21, and thus from input 1, to be stored in frame store 5. The contents of this frame store are then fed repeatedly to the display means 6 so that a still picture from the sequence of video signals input at 1 can be seen. The still picture will be of the form of FIG. 1a. The two inputs 1 and 2 and the freeze frame means may be part of a known video editing system.

Once a still picture has been obtained in this way the area defining means can be used to mark the outline of an area, for example ref. 24 FIG. 1a, on the picture as displayed on the display device. The area enclosed within the outline is the area which is to be used in the detecting means to detect the range of the chroma key characteristic. The area defining means consists of touch tablet and stylus means 7, address generator 8, frame store 9 and graphics signal means 10. The graphic signal means 10 produces a signal which initially is stored in frame store 9 in response to the address generator 8 and then combined with the signals from frame store 5 in combiner 11, the resultant signal being continuously displayed on display device 6. The combiner may be in the form of an inhibitor which inhibits signals from frame store 5 at the addresses where there are video graphic signals in frame store 9, thus producing a "black" point for each point touched by the stylus of means 7 as the stylus is moved to define the area to be used to detect the video key characteristic. In this way the graphic signal means produces a signal which represents the outline of the area. The address in frame store 9 at which the graphic signals are to be stored are generated by the address generator 8 in response to signals from touch tablet means 7. The touch tablet generate signals representative of the co-ordinates of a point where the stylus has touched the tablet and these signals are converted by the address generator to address signals for frame store 9. The area defining means could be part of a system such as described in UK Patent Application No. 8136539 which corresponds to U.S. Pat. No. 4,514,818.

When the area has been defined a signal selector 12 selects video signals from within this area from frame store 5. The signal selector selects the signals in response to the addresses generated in address generator 8 by blocking the signals from outside the defined area. The selected signals are then input into the detection means 13 which detects the range of Y, U, V present in order to define a volume in color space which is to be used as the chroma key. This information is stored in store 25 to be used by the switch means 14. The Y, U, V values of the video signals in channel 21 are analysed in the switch means and whenever all three values fall within the defined range the switch means operates to connect in channel 22. The analyser may be a simple window circuit to detect whether the incoming Y, U, V values are greater than the minimum Y, U, V values detected and less than the maximum. Other criteria may however be used for operating the switch 14. The switch means outputs the signals from the selected input along path 15 to display device 6.

We claim:

1. A video signal editing system compring;
   at least two input channels for video signals representing different pictures;
   an output channel;
   switch means for selectively outputting the video signal from one or another of the input channels to said output channel in dependence on the presence of absence of signals in one of said channels denoting a predetermined characteristic;
   means for defining a selectable area of the picture represented by the signals in said one channel;
   and means for detecting the range of signals in said area denoting said characteristic;
   said switch means being arranged to perform the relative switching in dependence upon the presence or absence of signals in said range or in a range related thereto.

2. A system, as in claim 1, wherein said area defining means includes:
   freeze frame means for displaying a still picture of a frame of video signal in one channel,
   video graphic means for designating on said still picture the boundary of said area and
   means for generating address signals for applying video signals representing the picture points in said area to said detecting means.

3. A system as in claim 2, wherein said video graphic means includes touch tablet and stylus means.

4. A system as in claim 1, wherein said predetermined characteristic is the color of said video signals.

5. A system as in claim 4, wherein said switch means further includes means operative in response to the presence of signals within the range of color detected to selectively switch the input channels.

6. A system as in claim 5, wherein said switch means includes means operative when signals representing three color components with the range detected for each component are present to selectively switch the input channels.

7. A method of video editing comprising the steps of:
   providing two or more sets of video signals representing different pictures;
   displaying a composite picture provided from signals from said sets of video signals;
   switching the video signals so that the display means receives signals from one set or another of said sets of video signals, said switching being dependent on the presence or absence of signals in one of the sets denoting a predetermined characteristic; and
   defining selectable area of the picture represented by signals in one of said sets and detecting the range of signals in said area denoting said predetermined characteristic.

8. Video signal editing system comprising:
   a first video channel for a foreground picture and a second video channel for a background picture;
   means for defining a selectable area of a selectable frame of the foreground picture, which is outside a selected feature of the foreground picture desired to be visible in a composite picture made up of parts of the foreground and background picutres, and for determining the range of video signals in the selected area, to thereby establish a selected range of video signals;
   a video display device;
   means for switching the second video channel to the display device when the video signals of the first channel correspond to said range in the selected area and for switching the first video channel to the display device otherwise, to thereby display a composite picture which shows said selected feature of the foreground picture and shows the background picture in the picture area outside said selected feature.

9. A system as in claim 8 in which the video signals are luminance and color signals for color pictures, and said range comprises a respective range for each of the luminance and color singals.

10. A system as in claim 8 in which the video signals are luminance and color signals for color pictures, and said range comprises a multidimensional range in which the range for each dimension is independently selectable.

* * * * *